Aug. 28, 1956
E. P. KELLIE
2,760,596
AUTOMATIC DUMPING LIQUID TRAP
Filed Sept. 24, 1954
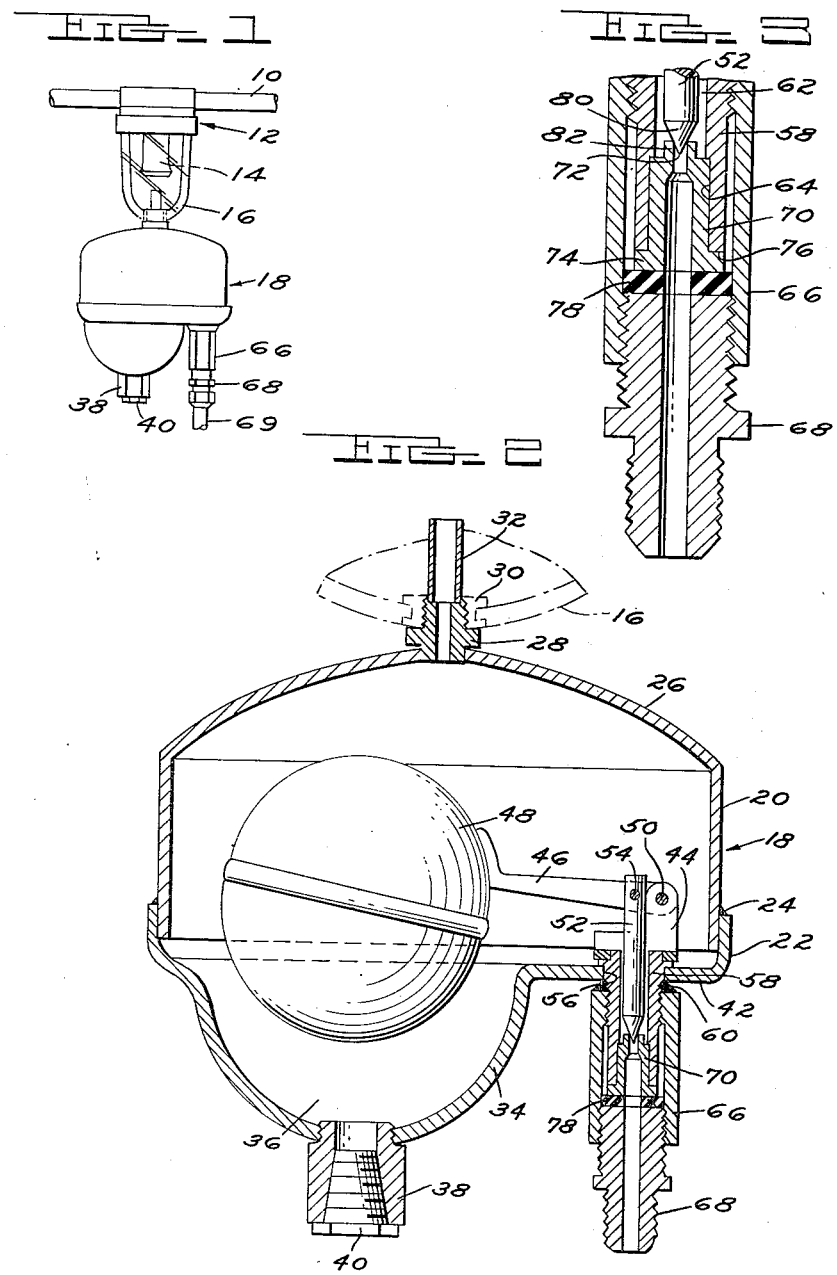
INVENTOR.
EDWARD P. KELLIE
BY
ATTORNEYS United States Patent Office 2,760,596
Patented Aug. 28, 1956

2,760,596

AUTOMATIC DUMPING LIQUID TRAP

Edward P. Kellie, Detroit, Mich.

Application September 24, 1954, Serial No. 458,046

10 Claims. (Cl. 183—42)

This invention relates to a liquid trap and has more particularly to do with a device for automatically removing liquid such as water or oil accumulating in a filter bowl from an air line.

Many types of compressed air lines such as used with paint spraying equipment, for example, are provided with filters for removing oil, water and other foreign substances from the compressed air passing through the lines. The filter is usually provided with a filter bowl in which the liquid and other matter removed from the air accumulates. In conventional filter systems, after a certain amount of this liquid and other matter forming sludge accumulates in the filter bowl, it is necessary to stop the flow of compressed air through the line, remove the filter bowl, dump the liquid therefrom and clean it out.

It is an object of this invention to provide a device for automatically and periodically dumping or ejecting the liquid accumulating in the bowl of a filter in an air line.

A further object of the invention is to provide a device of the type described which is very light in weight and which can be supported directly from the filter bowl itself.

A further object of the invention is to provide a device of the type described which is designed to be serviced and cleaned out very readily and without shutting off the compressed air in the line in which the filter is located.

In the drawings:

Fig. 1 shows an arrangement of a filter in a compressed air line provided with the automatic dumping trap of the present invention.

Fig. 2 is a sectional vertical view of the automatic dumping trap of this invention.

Fig. 3 is an enlarged sectional view showing the details of the valve seat in the trap.

Referring to the drawings, there is shown a compressed air line at 10 in which is located a filter assembly 12. This assembly includes a filter member proper 14 and a filter bowl formed of glass, plastic or the like 16. The arrangement is such that the water, oil and other foreign matter in the air flowing through line 10 is deposited by the filter 14 and accumulates in the bowl 16.

The automatic dumping trap of this invention is adapted to be connected into and supported by the bowl 16 of filter 12. The device includes a casing 18 which comprises upper and lower complementary sheet metal shells 20 and 22. These shells are permanently secured together by means of a weld or brazing at 24. The upper shell 20 has a dome shaped top wall 26 to the center of which is permanently secured an inlet fitting 28. Fitting 28 is adapted for threaded connection with a threaded bushing 30 forming the outlet fitting at the bottom of filter bowl 16. A tube 32 is secured to fitting 28 so that it projects upwardly above the lower end of filter bowl 16.

The lower shell 22 is fashioned with a semi-spherical portion 34 which forms a sump 36 at the lower end of casing 18. An outlet fitting 38 is secured to the lower end of the portion 34. Means are provided for optionally opening or closing fitting 38. In the embodiment illustrated, these means are shown in the form of a plug 40; but a pet cock may be used in place of plug 40 if desired.

The lower shell 22 is fashioned with a flat portion 42 at one side of sump 36. A bifurcated bracket 44 is mounted within casing 18 on the flat portion 42. A lever 46 which supports a ball float 48 is pivotally mounted on bracket 44 as by a pin 50. Lever 46 pivotally supports a needle valve 52 as by a pin 54. Adjacent the bracket 44, the flat portion 42 of the shell 22 is apertured as at 56 to receive an outlet fitting 58. Fitting 58 is permanently secured in opening 56 as by a weld 60. Fitting 58 is provided with an axial bore 62 which is counterbored at its lower end as at 64. Fitting 58 is externally threaded to threadily engage with a sleeve 66. A reducing nipple 68 is threaded into the lower end of sleeve 66 and provides a means for connecting an outlet conduit 69 with the outlet of casing 18.

Within the counterbore 64 of outlet fitting 58, there is arranged a valve seat member 70 having an orifice 72 at one end and an annular flange 74 at its other end. The valve seat members 70 is telescopically arranged within the lower end of fitting 58 with the annular flange 74 abutting axially against the lower end face 76 of fitting 58. Between the upper end of nipple 68 and the lower face of flange 74, there is arranged a gasket 78. Nipple 68 is arranged to be threaded into the lower end of sleeve 66 to compress gasket 78 between flange 74 and the upper end of nipple 68. This provides a fluid tight connection between these members and at the same time urges the flange 74 of member 70 upwardly against the lower end face 76 of fitting 58. The conical end 80 of valve stem 52 is arranged to seat in orifice 72.

In operation, liquid such as water, oil and other foreign matter is removed from the air passing through line 10 by the filter member 14. This liquid and other foreign material is deposited in bowl 16. When the level of the liquid in bowl 16 rises to above the upper end of tube 32, the liquid drains through tube 32 and into casing 18. This liquid together with any sludge that may flow through tube 32 accumulates in the sump 36. When the liquid level in casing 18 rises above the plane of the upper end of bore 62, ball float 48, because of the bouyancy effect of the liquid thereon, is caused to rise and thereby pivot lever 46 clockwise about the pin 50. This pivotal movement of lever 46 raises the conical end 80 of valve stem 52 from seating engagement with collar portion 82 of valve seat member 70 which forms orifice 72. Thus, the excess water and oil in casing 18 is blown out of the casing through orifice 72. As the liquid level in casing 18 recedes, ball float 48 moves downwardly until a position is reached wherein the conical end 80 of valve stem 52 seats in orifice 72.

Casing 18 is relatively small in size and the sump 36 is dimensioned such that the ball float 48 rises to open orifice 72 upon the accumulation of three or four ounces of liquid in sump 36. Thus, the liquid accumulating in casing 18 from filter bowl 16 is periodically and automatically ejected from the casing without necessitating shutting down of the compressed air line 10. Plug 40 is periodically removed to effect a blow out of dirt and sludge from within sump 36.

It will be appreciated, of course, that blow out of the device is necessitated only infrequently as compared with the periodic clean out of filter bowl 16 when the filter trap of this invention is not employed. It will also be observed that by making casing 18 out of light weight shells and permanently securing them together by the weld or brazing at 24, the whole assembly is of extremely light weight. The necessity for forming circumferential flanges around the open ends of shells 20 and 22 as well as the provision of bolts for securing these flanges together with a gasket in between is eliminated. The shells may be permanently secured together in this manner to provide a light weight assembly because servicing of the device resolves itself into infrequent cleaning out of orifice 72. This is accomplished by merely removing nipple 68 to thereby permit valve seat member 70 to be retracted from within the counterbore 64 of outlet fitting 58.

I claim:

1. An automatic dumping liquid trap adapted to be supported at the bottom of a filter bowl in an air line comprising a hollow casing having a top section provided with an inlet fitting and a bottom section, said sections being secured together to form a chamber, said bottom section having a bottom wall, said bottom wall having a flat portion adjacent one side of the chamber and having a downwardly depending recess adjacent said flat portion and forming a sump, a float member pivotally supported on said flat portion and extending downwardly into said sump below the level of said flat portion so as to be movable in response to the change in the liquid level in said sump, a threaded outlet orifice fitting supported on said flat portion, a valve member operatively connected with said flat member and extending vertically downwardly into cooperation with the orifice in said fitting, said first member and valve being designed such that when the liquid level in said sump approaches the level of said flat portion of said bottom wall, said valve member is lifted to open said orifice and thereby discharge liquid from said casing until the level thereof recedes in said sump to a point below said flat portion of said bottom wall to thereby shift the valve downwardly and close said orifice.

2. A device as called for in claim 1 wherein said inlet fitting includes a vertically upwardly extending conduit arranged to extend upwardly into the filter bowl and above the bottom wall thereof to which said trap is threadedly connected.

3. A device as called for in claim 1 wherein said casing comprises two sheet metal half sections telescopically arranged one within the other and a weld extending around the telescoping portions thereof and permanently securing said half sections together.

4. A device as called for in claim 1 wherein said casing comprises two sheet metal half sections and includes means forming a permanent connection between the adjacent edges of said half sections.

5. A device as called for in claim 1 wherein said outlet orifice fitting includes a threaded sleeve secured to said flat portion of said bottom wall and having a threaded portion extending exteriorly of said casing, a valve seat member insertable within said sleeve from the outer end thereof, means engageable with the threaded portion of said sleeve for removably retaining said valve seat member in said sleeve, said valve cooperating with said valve seat member to control said orifice.

6. A device as called for in claim 5 wherein said valve seat is provided with an annular flange which abuts against the outlet end of said outlet fitting and threaded means engaged with the threads on said outlet fitting for maintaining said flange in abutting relation with the outlet end of said outlet fitting.

7. In combination, a conduit for conveying gaseous fluid under pressure, a filter unit connected into said conduit, said filter unit comprising a filter member adapted to extract liquids from the fluid in said line, a bowl surrounding said filter member and into which the liquid extracted from the fluid passing through said line is arranged to be deposited, said bowl having a threaded opening at the bottom thereof, a hollow casing having a threaded inlet fitting at the top thereof, said inlet fitting being threaded into the threaded outlet opening on said filter bowl, said casing having a sump at the bottom thereof and having a flat horizontally extending bottom wall portion disposed at a level between said sump and said inlet fitting, said flat bottom wall portion having an outlet orifice thereon, a float member in said casing pivotally supported on said flat portion of the bottom wall and extending downwardly into said sump below the level of said flat bottom wall portion, a valve member operatively connected with said float member and responsive to movement of said float due to change of liquid level in said sump to control said outlet orifice, said valve being arranged to close said orifice when the liquid level in said casing recedes below the level of said flat bottom wall portion.

8. The combination called for in claim 7 wherein said inlet fitting includes a member which extends up through the bottom wall of said filter bowl and terminates at its upper end at a plane spaced substantially above the bottom wall of said bowl to thereby provide an overflow pipe in said filter bowl.

9. The combination called for in claim 7 wherein said sump is provided with an outlet opening at the bottom thereof and including means for opening and closing said sump outlet opening.

10. The combination called for in claim 7 wherein said casing comprises a pair of complementary sheet metal shells permanently secured together at their complementary edges by a weld.

References Cited in the file of this patent

UNITED STATES PATENTS

| 434,675 | McDaniel | Aug. 19, 1890 |
| 1,122,994 | Pappano et al. | Dec. 29, 1914 |
| 1,840,792 | Quick | Jan. 12, 1932 |
| 1,995,075 | Murphy | Mar. 12, 1935 |
| 2,399,996 | Fitch | May 7, 1946 |
| 2,510,049 | Neeson | May 30, 1950 |
| 2,548,236 | Parks | Apr. 10, 1951 |